Feb. 9, 1965  J. BELLA, JR  3,169,021
GAME BOARD
Filed Jan. 6, 1961
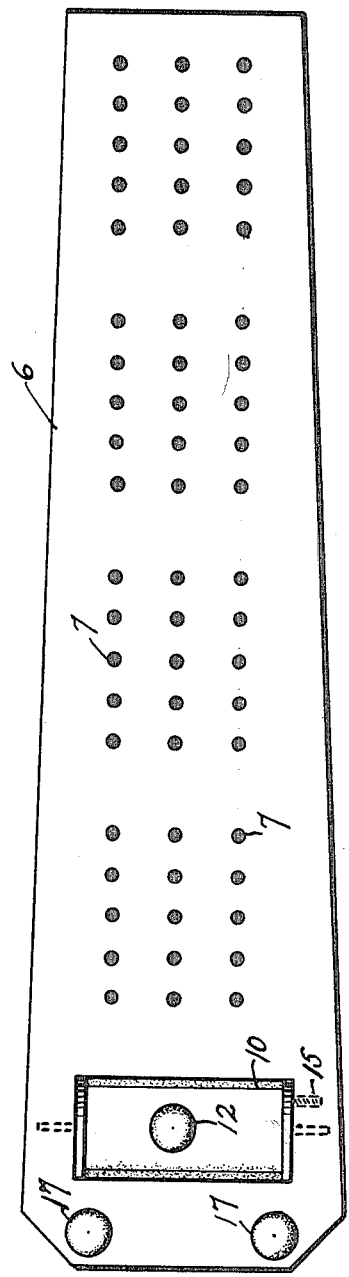
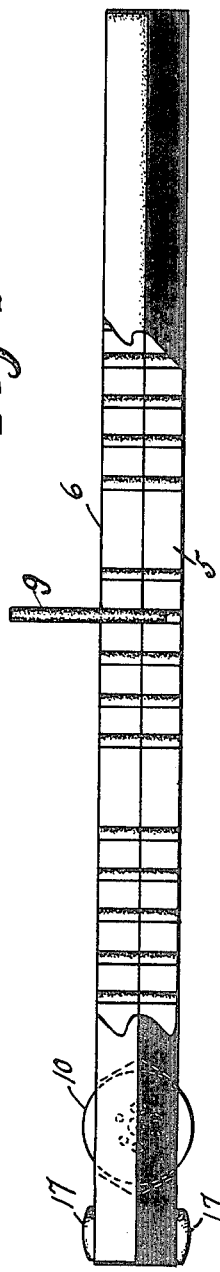
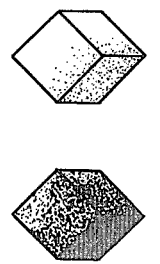
INVENTOR.
John Bella, Jr.
BY
Roy Griffith Jones

United States Patent Office 3,169,021
Patented Feb. 9, 1965

3,169,021
GAME BOARD
John Belia, Jr., 344 Orange St., Newark, N.J.
Filed Jan. 6, 1961, Ser. No. 81,126
1 Claim. (Cl. 273—134)

This invention relates to a game board.

The board of this invention, of which one is used by each played, in used with dice, to determine which player runs up the largest number of points, provision being made by the construction of the board and the rules of the game to provide a variety of alternative chances and thus enhance the interest of the game.

Each board has two similar faces, but differently colored, the side to be played being determined by the throw of three dice, the latter each having three sides of a color corresponding to the color of one face of the board and the other three sides of a color corresponding to the other face of the board. Each board has rows of holes into which pegs are inserted to keep the score. Each board includes a roller bearing different numbers of indicia or markings, of which, for example, there may be three on different sides, the player to elect whether he will play according to the rules of the side marked with the 1, 2 or 3 indicia. The mentioned roller preferably extends a little beyond both faces of the board, and there are a pair of lifts at one end of the board to allow the roller to be manually turned.

The drawings illustrate the invention, and in these:

FIGURE 1 is a plan view of the board;

FIG. 2 is a side view, partly in section and partly in elevation; and

FIG. 3 shows two perspective views of a single die, the latter having three faces of one color and the other three faces of a different color, each color corresponding to that of a face on the board.

Referring to the drawings for a detailed description, the tapered, elongate board is shown as being composite, and comprising differently colored pieces 5 and 6 secured together. Transverse apertures 7, arranged in three linear series, extended through the board, to receive a pair of pegs from either face, as peg 9 of FIG. 2, for the purpose of keeping score. A roller 10 is mounted in, and near the head of, the board, and has three flat faces, one of which bears or carries one button 12 or other marking or indicium, as shown in FIG. 1, and the other two faces, two and three of the same indicia, respectively. One end of the roller is provided with a detent, pressed by a coiled spring 15, to hold the roller in a selected position. The roller extends slightly beyond each face of the board, so that it may be readily turned, and, to hold the roller above a resting surface a pair of lifts 17 are provided at the head of the board on each face.

Three dice are used in playing the game, one of which is shown in the two views of FIG. 3. Of the six faces of each die, three are colored to correspond to one face of the board and the other three to correspond to the other face. In FIG. 3, one figure shows three faces of a dark color, and the other view shows the other three faces of a light or white color.

As stated, each player has a board. To start the game, one die is rolled by each player, and he plays that face of the board corresponding to the color of the face of the die that comes up. Then each player elects to play, according to the rules, with 1, 2, and 3 spots, marking or indicia on the roller 10, which is accordingly turned to the up position, to remain there during a game. Each player then rolls three dice, each as shown in FIG. 3. To explain the further rules of the game, the colors on the dice, and on the faces of the board, will be called black and white. If playing the white side of the board and one spot on the roller, and the three dice come up white, the player gets three points and so puts a peg in the third hole of an end series of holes; if two white faces of the three dice come up, the player gets two points, and one point if only one white face is up. And if three black faces come up, there is no penalty, i.e., no points are lost. If playing two spots on the roller and the white side of the board, the player gets two times three or six points if three white faces of the dice come up, and gets two times two or four points if two white faces are up, and two points if one white face is up. If three black faces of the dice come up, the player losses six points, and if he has not, up to this point, acquired six points, he is out of the game. When playing three spots on the roller, the player gets three times three or nine points if three white faces come up, two times three or six points if two white faces come up, and three points if only one white face is up. If three black faces are up, the player loses three times three or nine points. The above rules are stated for playing the white face of the board, as to the faces up of the dice; when the black face is played, the rules stated apply, reading white for black and vice versa.

What is claimed is:

A composite game board consisting of two elongate boards of different colors secured together facewise and having a plurality of linear series of holes extending depthwise through the composite board to receive a peg from either face, a single rotor journalled transversely in the board adjacent one end and having three faces, bearing respectively one, two and three indicia, said rotor having part of its periphery extending equally above and below the composite board and adapted for manual turning from one of its faces to another, and lifts on both faces of the composite board adjacent said rotor to support the latter for free turning.

References Cited in the file of this patent
UNITED STATES PATENTS

| | | |
|---|---|---|
| 935,258 | Immer | Sept. 28, 1909 |
| 1,494,876 | Zander | May 20, 1924 |
| 1,522,714 | Dietze et al. | Jan. 13, 1925 |
| 2,120,439 | Jamison | June 21, 1938 |
| 2,290,519 | Young | July 21, 1942 |
| 2,698,181 | Kitovich | Dec. 28, 1954 |
| 2,755,024 | Cox | July 17, 1956 |